April 28, 1942.  H. H. RAYMOND  2,281,204
MAGNETIC TENSION DEVICE
Filed Dec. 4, 1940  2 Sheets-Sheet 1

Inventor:
Horace H. Raymond
By
Attorneys.

April 28, 1942. H. H. RAYMOND 2,281,204
MAGNETIC TENSION DEVICE
Filed Dec. 4, 1940  2 Sheets-Sheet 2

Inventor:
Horace H. Raymond
By
Pennington & White
Attorneys.

Patented Apr. 28, 1942

2,281,204

UNITED STATES PATENT OFFICE 2,281,204

MAGNETIC TENSION DEVICE

Horace H. Raymond, Berlin, Conn., assignor to American Paper Tube Co., Woonsocket, R. I., a corporation of Rhode Island Application December 4, 1940, Serial No. 368,511

8 Claims. (Cl. 139—212)

This invention relates to improvements in tension-devices for tensioning yarn, thread and other strand materials and more particularly to tension-devices especially adapted for tensioning the strand drawing off from a bobbin in a loom shuttle.

One of the objects of the present invention is to provide a tension-device of the type indicated having tension-members operated by the attraction or repulsion of a permanent magnet to apply tension to a yarn strand feeding therebetween.

Another object of the invention is to provide a tension-device of the type indicated which eliminates the necessity of springs, elastic bands or other operating means for applying pressure to the tension-members.

Another object of the present invention is to provide a tension-device of the type indicated which is of simple and compact construction, reliable in operation and adapted for use over long periods of time without repair or replacement of the parts.

Further objects of the invention are set forth in the following specification which describes a preferred embodiment of the invention and a number of modified forms of construction of the tension-members, by way of example, as illustrated by the accompanying drawings. In the drawings.

Figure 1:
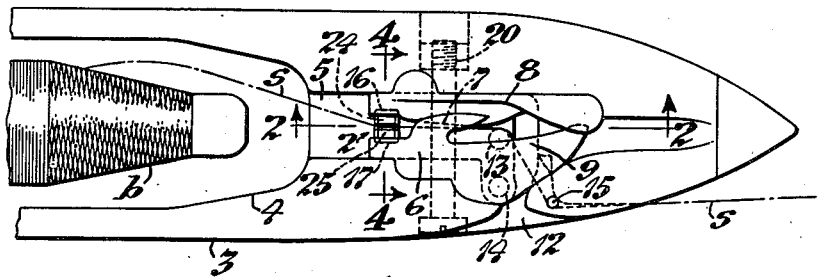
Fig. 1 is a plan view of a portion of a loom shuttle showing the tension-device of the present invention applied thereto.
Figure 2:
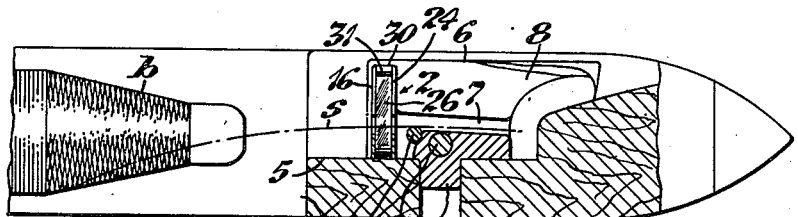
Fig. 2 is a longitudinal sectional view on line 2—2 of Fig. 1 showing the thread passage in the loom shuttle and the relationship of the tension-members with respect thereto.
Figure 3:
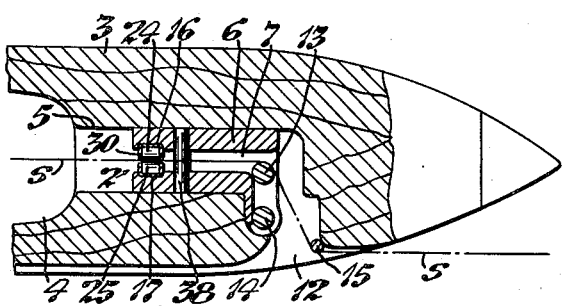
Fig. 3 is a sectional plan view of the loom shuttle showing the means for guiding the yarn strand through the eye at the side of the shuttle.
Figure 6:
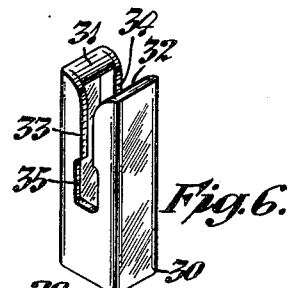
Fig. 6 is a perspective view of the casing for supporting the tension-members in operative position.

Heretofore it has been the general practice to provide a tension-device in a loom shuttle comprising a pair of tension-members between which the yarn strand draws with adjustable spring means or an elastic band for applying pressure to at least one of the tension-members. Due to the continuous striking of the shuttle by the picker-stick during the operation of the loom the spring means for controlling the pressure applied to the yarn by the tension-members is apt to get out of adjustment and thereby vary the tension applied to the yarn. Moreover, the delicate springs are liable to lose their resilience and also to be broken due to the shock and jar of the shuttle as it is "thrown" across the loom by the picker-stick.

The present invention is distinguished from such known devices in that at least one of the tension-members is permanently magnetized and the other tension-member is of magnetically-responsive material. In some instances, both of the tension-members may be permanently magnetized with their poles arranged in alternate relationship whereby the force of mutual attraction causes them to press against the yarn strand to apply a constant predetermined tension thereto. In other instances the tension-members may be operated by the repulsive force of a permanent magnet.

In Figs. 1 to 5 of the present drawings the tension-device 2 constituting the subject matter of the invention is illustrated as applied to a broad-loom shuttle 3 but it will be understood that the device is adapted for general application to apply tension to a yarn strand in any drawing-off or delivery process. The loom shuttle 3 has the usual bobbin recess 4 and a guideway 5 in which a guide-block 6 is mounted. The guide-block 6, in the form of a metal casting, is provided with a thread passage 7 extending longitudinally thereof and has suitable thread-guiding surfaces 8 and 9 for directing the thread or yarn strand s into position in the passage on the first pick of the shuttle after a bobbin has been transferred thereto. A thread-delivery eye 12 is provided in one side of the body of the shuttle 3 adjacent the guide-block 6 and suitable guide-pins 13, 14 and 15 positioned within the shuttle body or carried by the guide-block, act to guide the strand during operation of the shuttle in a loom. The guide-block 6 in the present instance is also provided with suitable recesses 16 and 17 at opposite sides of the thread passage 7 for mounting the tension-device 2, to be described later in detail.

The guide-block 6 is of irregular shape and seats in a correspondingly-shaped recess in the guideway 5 in the body of the shuttle 3 and the block has a depending lug 18 which engages in a recess in the shuttle body to hold it in proper position therein. A holding pin 20 is passed through the shuttle body and through an opening formed in the guide-block 6 to anchor the latter in the shuttle. As thus far described the shuttle is not substantially different from those commonly known in the art.

In accordance with the present invention a novel form of tension-device 2 is provided for applying a predetermined amount of tension to the yarn or thread as it draws off from the bobbin b during the reciprocation of the shuttle 3 in the loom. The tension-device 2 illustrated in Figs. 1 to 7 comprises a pair of generally rectangularly-shaped tension-members or pads 24 and 25, see Fig. 7, having cooperating flat contact faces 26 and 27. The ends of the cooperating contact faces 26 and 27 of the tension-members or pads 24 and 25 are preferably rounded or beveled on their opposed sides as indicated at 28 and 29 to provide a tapering groove therebetween for guiding the yarn between their contact faces. At least one of the tension-members 24 or 25 is constructed of permanently magnetized material, such as iron, steel or a suitable alloy, or in other cases a suitable plastic incorporating granules of a magnetic material, and the opposite member is of magnetically-responsive material. It will be understood, however, that both of the tension-members 24 and 25 may be permanently magnetized and arranged with their poles in alternate relationship. Thus, the magnetic attraction of the tension-members 24 and 25 causes the contact faces 26 and 27 to bear against the strand s drawing therebetween with a predetermined constant pressure to apply a predetermined degree of tension thereon.

The tension-members 24 and 25 may be supported in any suitable manner, but as herein illustrated they are contained in a hollow rectangular casing 30 of non-magnetic material, such as brass, copper, suitable plastic or the like, which closely fits in the recesses 16 and 17 in the guide-block 6 at opposite sides of the thread passage 7. The casing 30 has an open bottom to adapt the tension-members to be inserted thereinto and inwardly curved lips 31 and 32 at its upper end overlying the curved ends 28 and 29 of the tension-members 24 and 25. The forward and rearward side walls of the hollow casing 30 are provided with alined slots 33 and 34 which terminate at the bottom in enlarged openings 35 and 36. The casing 30 with the tension-members 24 and 25 positioned therein is slid upwardly into the recesses 16 and 17 in the guide-block 6 from the bottom thereof before the block is mounted in the shuttle 3. As stated above, the casing 30 closely fits within the recesses 16 and 17 in the guide-block 6 and is prevented from upward movement therein by the engagement of its upper end with shoulders 37 at the top of the recesses, see Fig. 4. When the guide-block 6 has been anchored in position in the shuttle 3 the lower ends of the tension-members 24 and 25 seat against the bottom of the recess in the guideway 5 of the shuttle, see Figs. 2 and 4. The guide-block 6 is also provided with a transversely extending pin 38 in the thread passage 7 to guide the yarn strand s to prevent it from bearing against the bottom of the enlarged openings 35 and 36 in the casing 30. Although the tension-members 24 and 25 are illustrated as supported in the casing 30 in Figs. 1 to 6, it will be understood that the recesses 16 and 17 in the guide-block 6 may be so shaped as to retain the tension-members in proper position, thus eliminating the need of a casing.

For different conditions, such as variations in the nature and size or denier of the yarn used and the character of a fabric being woven, the tension applied by the tension-members 24 and 25 of the tension-device 2 may be varied. For this purpose a series of sets of tension-members 24 and 25 may be provided for use with each shuttle and suitably marked to indicate the magnetism or affinity of the different members. For example, a series of sets of blocks marked individually 1 to 5 with each set varying in their degree of mutual attraction, one for the other, may be used in any combination to provide a great number of variations in the tension applied to the thread or yarn. As the strength of a permanent magnet varies in direct proportion to its cross-sectional area the variation in the mutual attraction of the different sets of tension-members 24 and 25 of a series may be obtained by varying their cross-sectional dimensions in the manner indicated by dash-lines in Fig. 7. The various sets of tension-members 24 and 25 may be changed, one for another, by merely removing the guide-block 6 from the shuttle 3 and withdrawing the casing 30 from the block, after which a different set of tension-members can be substituted for the set in place. One form of the invention having been described in detail, its mode of operation is as next explained.

Figures 4, 5:
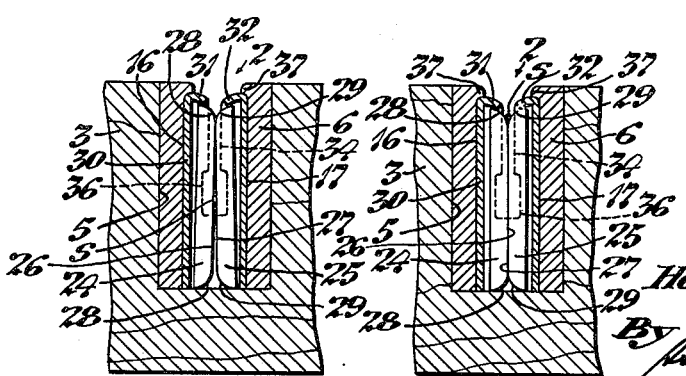
Fig. 4 is a transverse sectional view on line 4—4 of Fig. 1 showing the magnetic tension-members engaging the opposite sides of the yarn strand.
Fig. 5 is a view similar to Fig. 4 illustrating the manner in which the rounded or beveled ends of the tension-members adapt the yarn strand to be drawn therebetween.

During the operation of a shuttle 3 in the loom the exhausted bobbin b is replaced from time to time by a fresh bobbin and the end of its thread or yarn strand s is usually held in the transfer mechanism. During the first pick of the shuttle the thread or yarn strand s is drawn across the top of the guide-block 6 as it feeds from the bobbin b. The thread guiding surfaces 8 and 9 of the guide-block 6 act to guide the strand s into the longitudinally extending thread passage 7 and thereby draw the strand down through the reentrant opening between the curved ends 28 and 29 of the tension-members 24 and 25, see Fig. 5, and into the alined slots 33 and 34 in the casing 30, thus locating it between the contact faces of the tension-members substantially midway of their ends as indicated in Fig. 4. The mutual attraction of the tension-members 24 and 25, resulting from the permanent magnetism of at least one of the members causes them to apply a predetermined pressure on the thread or yarn, and as the tension-members are held by the casing 30 from movement with the strand they apply a constant drag or tension on the strand. During the return stroke of the shuttle 3 the yarn strand s is drawn back under the curved guiding surface 9 and into the eye 12 at the side of the shuttle 3 so that thereafter it draws out through said eye during continued operation of the shuttle 3 in the loom.

The pair of tension-members or pads 24 and 25 act at all times to exert a predetermined pressure on the thread or yarn strand s and thereby apply a constant tension thereto. If the type of yarn used or the character of the fabric being woven requires a greater or lesser degree of tension it is only necessary to remove the guide-block 6 from the shuttle and then withdraw the pads 24 and 25 from the casing 30 and replace this set of the pads with another set having the required mutual attraction to produce the tension desired.

It will be noted that both ends of the tension-members 24 and 25 are shown as rounded off or beveled so that they may be reversed in position in the casing 30 to provide for longer wear of their contact faces and further to insure that they will not be improperly positioned in the casing. Furthermore, it will be noted by reference to Fig. 4 that when the yarn strand is drawn to its operative position between the tension-members 24 and 25 the upper ends of the members are drawn together to form an inverted V tending to hold the yarn strand from drawing upwardly out of the members.

The tension-members may have other forms from that illustrated in Figs. 1 to 7 and may be mounted in suitably shaped recesses in the guide-block for holding them in position whereby to eliminate the necessity of a separate casing. A number of such modified forms of tension-members are illustrated in Figs. 8 to 18. The tension-members illustrated in Figs. 8 to 18 may be composed of any suitable magnetic material such as iron, steel, an alloy or a suitable plastic incorporating granules of magnetic material as described with respect to the tension-members illustrated in Figs. 1 to 7.

Figure 8:
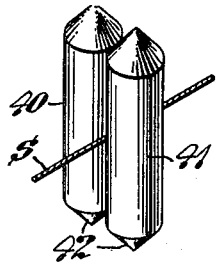
Fig. 8 is a perspective view of a pair of tension-members of cylindrical form to adapt them to rotate.

In Fig. 8 a pair of cylindrical tension-members 40 and 41 is shown having conical ends 42. At least one of the tension-members 40 or 41 is permanently magnetized and the other tension-member is magnetically-responsive to cause them to bear against a strand s drawing therebetween with a predetermined pressure. The tension-members 40 and 41 are adapted to be mounted in suitable bearings in the guide-block so that they may rotate about their axes.

Figure 9:
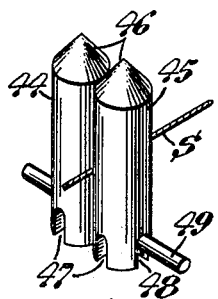
Fig. 9 is a perspective view of a modified form of cylindrical tension-members with means for holding them to prevent rotation.

In Fig. 9 a pair of cylindrical tension-members 44 and 45 is illustrated having one end 46 of conical form and a plane face at their opposite end provided with right-angular slots 47 and 48. A pin 49 is adapted to extend through alined slots 47 or 48 in adjacent tension-members 44 and 45 to hold them against rotation whereby to increase the tension applied to the yarn strand s over that applied by the form of tension-members illustrated in Fig. 8. In case of wear the tension members 44 and 45 may be turned to any of four positions of adjustment to present different faces for contacting the yarn strands s. It will be observed that the tension-members 44 and 45 may be positioned in suitable recesses in the guide-block at opposite sides of the thread passage, either with or without a separate casing for retaining the members. The tension-members 44 and 45 may both be permanently magnetized or one permanently magnetized and the other magnetically-responsive.

Figure 10:
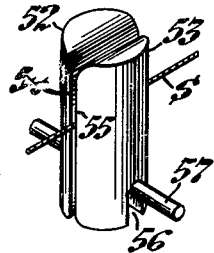
Fig. 10 is a perspective view of a pair of tension-members of semi-cylindrical form.

In Fig. 10 a pair of semi-cylindrical tension-members 52 and 53 is illustrated both having flat contact faces 54 and 55 with their upper ends flared to adapt the yarn strand s to be drawn therebetween. The lower ends of the tension-members 52 and 53 are provided with slots 56 adapted to aline to receive a pin 57. It will be observed that the tension-members 52 and 53 form a cylinder when arranged in operative position to adapt them to be mounted in a single circular bore in the guide-block having its axis alined with the axis of the thread passage. The tension-members 52 and 53 may both be permanently magnetized or one permanently magnetized and the other magnetically-responsive.

Figures 11, 12:
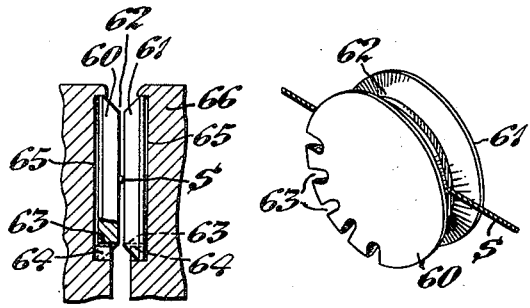
Fig. 11 is a transverse sectional view of a shuttle body showing another modified form of tension-members.
Fig. 12 is a perspective view of the tension-members illustrated in Fig. 11 showing their disk-like form to adapt them to be adjusted by turning one with respect to the other.

In Figs. 11 and 12 a pair of cooperating tension-members 60 and 61 is illustrated in the form of disks having their peripheries beveled or flared outwardly to provide a V-shaped groove 62 therebetween. Each of the tension-members 60 and 61 is permanently magnetized with its north and south poles arranged on a radial line. With the south pole of one of the tension-members 60 or 61 alined with the north pole of the opposite tension-member and maximum mutual attraction between the members occurs to cause them to apply a maximum tension on the yarn strand s. By rotating one of the tension-members 60 with respect to the other tension-member 61 the magnetic attraction between the members is gradually decreased to a zero value when their pole axes are 90° apart. Each of the tension-members 60 or 61 may be provided with a series of notches 63 in its periphery which cooperate with lugs 64 in recesses 65 in the guide-block 66 whereby the tension-device may be adjusted to vary the tension applied to the yarn strand s.

Figure 13:
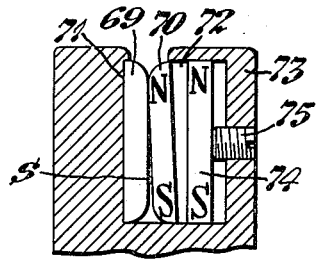
Fig. 13 is a transverse sectional view of a shuttle body showing a pair of tension-members actuated by the repulsive force of two adjacent magnets.

In Fig. 13 a tension-device of modified construction is illustrated wherein the repulsive force of two magnetized members is utilized to apply tension to the yarn strand s. The tension-members 69 and 70 are generally similar in form to those illustrated in Fig. 7 and are held in suitable recesses 71 and 72 in the shuttle body 73. The tension-member 70 is permanently magnetized and in the recess 72 at the rear of the tension-member 70 is a second magnetized member 74. The magnets 70 and 74 have their like poles alined whereby the two magnets repel each other to cause the tension-member 70 to be forced toward the tension-member 69. The magnet 74 may be moved toward or away from the magnetized tension-member 70 by means of a set screw 75 to vary the effective repellent force of the magnets to thereby vary the tension applied to the yarn strand s.

Figure 14:
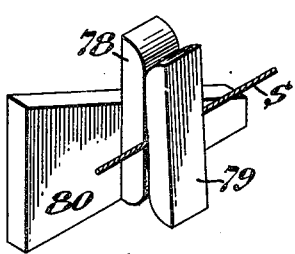
Fig. 14 is a perspective view of a modified form of tension-device having a tapered keeper at the rearward face of one of the tension-members for varying the magnetic attraction of one tension-member for the other.
Figure 15:
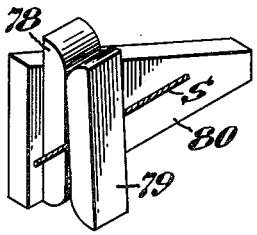
Fig. 15 is a view similar to Fig. 14 showing the tapered keeper moved to another position of adjustment.

In Figs. 14 and 15 a pair of tension-members 78 and 79 is illustrated which are similar in form to the tension-members 24 and 25 illustrated in Figs. 1 to 7. In this modified construction a keeper 80 is provided at the rear of the magnetized tension-member 78 to decrease its magnetic effect. The keeper 80 is of triangular form whereby to provide a gradually tapering face enaggeable with the rearward face of the tension-member 78. By manually adjusting the keeper 80 from the position illustrated in Fig. 14 to that illustrated in Fig. 15 the attractive force of the magnetized tension-member 78 to the tension-member 79 may be decreased to reduce the tension applied to the yarn strand s. Thus by varying the position of the keeper 80 with respect to the magnetized tension-member 78 the tension applied to the yarn strand s may be varied to adjust it for any particular condition.

Figure 16:
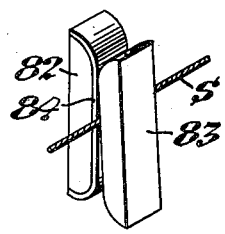
Fig. 16 is a perspective view of a pair of tension-members with a shim or covering on one of the tension-members for holding them spaced from each other to maintain a predetermined magnetic attraction between the members.

In Fig. 16 a pair of tension-members 82 and 83 is illustrated with the magnetized tension-member 82 held in spaced relationship to the tension-member 83 by means of a shim or covering 84. By substituting shims 84 of different thickness the magnetic attraction of the magnetized tension-member 82 for the tension-member 83 may be varied to vary the tension applied to the yarn strand s for particular conditions.

Figure 17:
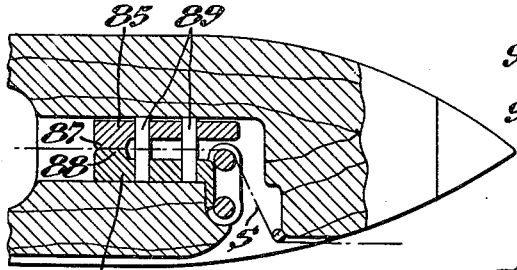
Fig. 17 is a sectional plan view of a portion of a shuttle showing the thread-block divided into separate magnetic sections and having pads engaging the yarn strand to apply tension thereto.

In Fig. 17 the thread-block is made in two separate parts 85 and 86, at least one of which is permanently magnetized and the other magnetically-responsive and so constructed as to apply tension on the yarn strand s. The separate parts 85 and 86 of the thread-block are provided with pads 87 and 88 adapted to bear against the yarn strand s and the two parts of the thread-block are held in proper position one with respect to the other by means of pins 89. With the construction illustrated in Fig. 17 the yarn strand s drawing through the thread-block is tensioned by the thread-block itself thereby eliminating the necessity of a separate tension means.

Figure 7:
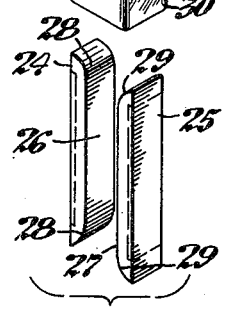
Fig. 7 is a perspective view of the pair of tension-members illustrated in spaced relationship.
Figure 18:
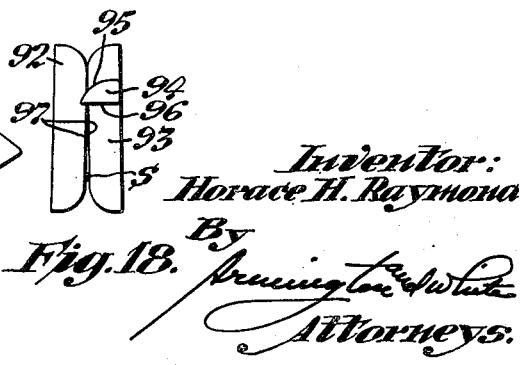
Fig. 18 is a front view of a pair of tension-members having means for permitting the yarn strand to be drawn therebetween while preventing its movement in the opposite direction.

In Fig. 18 a pair of tension-members 92 and 93 is illustrated of a form generally similar to that illustrated in Fig. 7. One of the tension-members 93, however, is provided with a lug 94 on one or both of its sides extending across the side of the adjacent tension-member 92. The upper edge 95 of the lug or lugs 94 is curved while the bottom edge 96 extends at right-angles to the contacting faces 97 of the tension-members. Thus the lug or lugs 94 permit the yarn strand s to be drawn down between the tension-members 92 and 93 to a position below the lug or lugs and the right-angular edge 96 prevents the yarn from moving upwardly and out of contact with the tension-members.

It will be observed from the foregoing description that the present invention provides a novel form of tension-device which produces a uniform tension on the yarn and eliminates the necessity of springs, elastic bands or other operating mechanism for exerting pressure on the tension-members. It will be observed further that the tension-device of the present invention is of simple and compact construction, economical in cost of construction and because of its elimination of operating means heretofore considered necessary it cannot get out of adjustment during use.

While several forms of the tension-device is herein illustrated and described it will be understood that further modifications may be made in the form and arrangement of the parts without departing from the spirit or scope of the invention. While the tension-device of the present invention is illustrated and described as applied to use in a loom shuttle it will be understood that the tension-device may be used in other textile apparatus. Therefore, without limiting myself in this respect,

I claim:

1. In combination, a loom shuttle having means for holding a bobbin of yarn or the like, and a tension-device in the shuttle comprising a pair of opposed tension-members adapted to act against the yarn strand drawing therebetween, at least one of said tension-members being permanently magnetized and the other being magnetically-responsive whereby said tension-members are drawn together to press against the yarn strand.

2. In combination, a loom shuttle having means for holding a bobbin of yarn or the like, and a tension-device in the shuttle comprising a pair of permanently magnetized members arranged in opposed relationship with the north pole of one adjacent the south pole of the other whereby their force of mutual attraction draws them together to press against the yarn strand drawing therebetween to apply a predetermined tension thereto.

3. In combination, a loom shuttle having means for holding a bobbin of yarn or the like, and a tension-device in the shuttle comprising a magnetically-responsive tension-member adapted to bear against the yarn strand drawing from the bobbin, and a permanent magnet mounted in the shuttle adjacent the tension-member to cause the latter to press against the yarn strand with a predetermined force to apply a constant tension thereto.

4. In combination, a loom shuttle having means for holding a bobbin of yarn or the like, and a tension-device in the shuttle comprising a magnetically-responsive tension-member adapted to bear against the yarn strand drawing from the bobbin, a permanent magnet mounted in the shuttle in fixed relation to the tension-member to cause the latter to press against the yarn strand with a predetermined constant force, and means for initially adjusting the relation of the magnet with respect to the magnetically-responsive tension-member to alter the predetermined constant tension applied to the yarn strand in accordance with requirements.

5. In combination, a loom shuttle having means for holding a bobbin of yarn or the like, and a tension-device in the shuttle comprising a pair of opposed tension-members adapted to bear against the yarn strand drawing therebetween, at least one of said tension-members being permanently magnetized and the other being magnetically-responsive, and a casing for mounting said tension-members in the shuttle to adapt them for relative movement toward each other whereby their magnetic attraction will draw them together to press against the yarn strand drawing therebetween.

6. A tension-device comprising a pair of permanently magnetized members arranged in opposed relationship with the north pole of one adjacent the south pole of the other whereby their force of mutual attraction draws them together to apply pressure on a yarn strand feeding therebetween.

7. A tension-device comprising a pair of disks arranged in opposed relationship, said disks being permanently magnetized whereby their force of mutual attraction draws them together to press against a yarn feeding between said disks, said disks being rotatable one with respect to the other to vary their force of mutual attraction, and means for holding the disks in any relatively rotated position, one with respect to the other.

8. A tension-device comprising a pair of tension-members arranged in opposed relationship, at least one of said tension-members being permanently magnetized and the other being magnetically-responsive whereby their force of attraction draws them together to press against a yarn strand drawing therebetween, and a tapered keeper adjacent the magnetized member and adjustable relatively of the latter to vary the magnetic effect of said magnetized member.

HORACE H. RAYMOND.